United States Patent Office 3,525,556
Patented Aug. 25, 1970

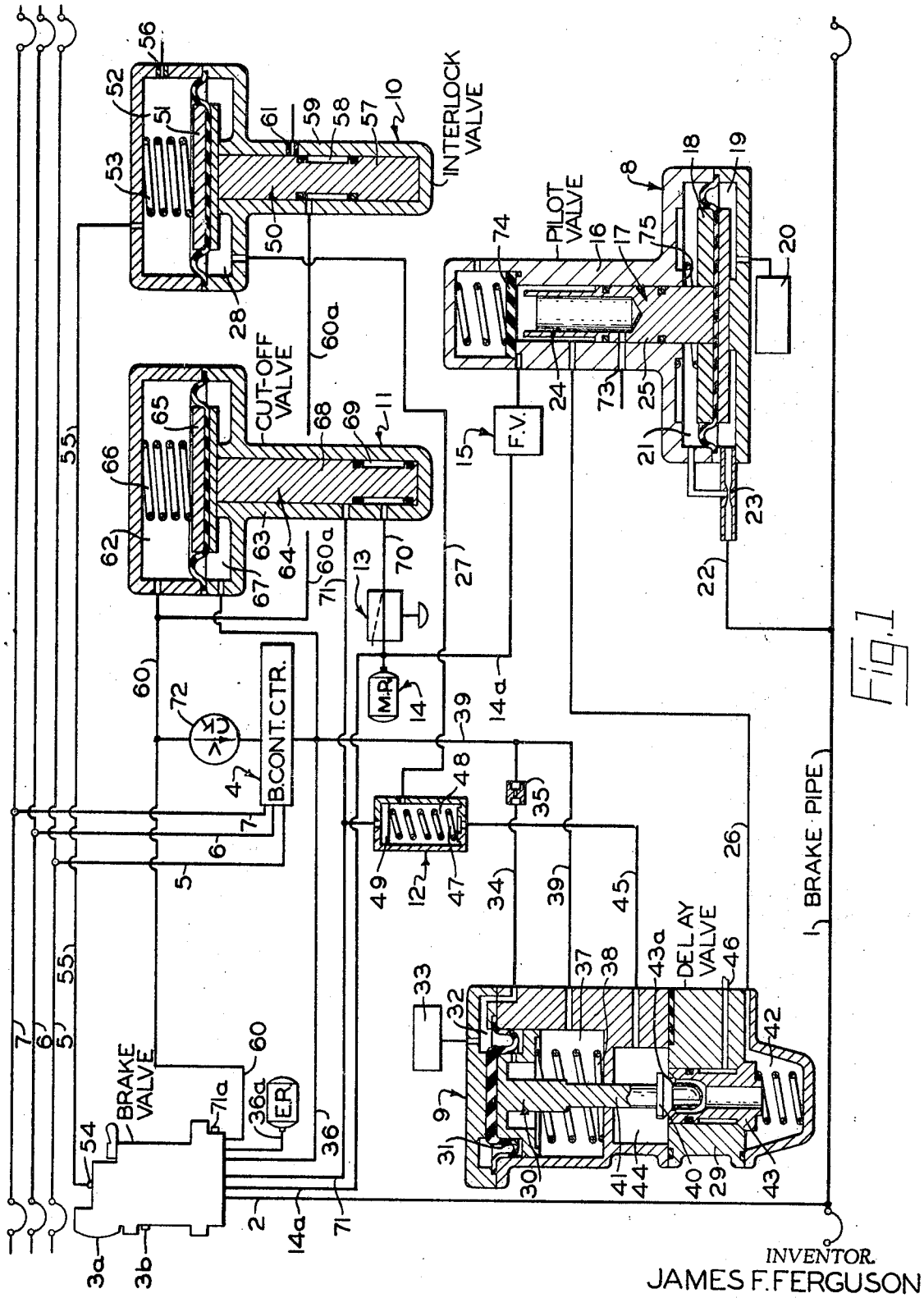

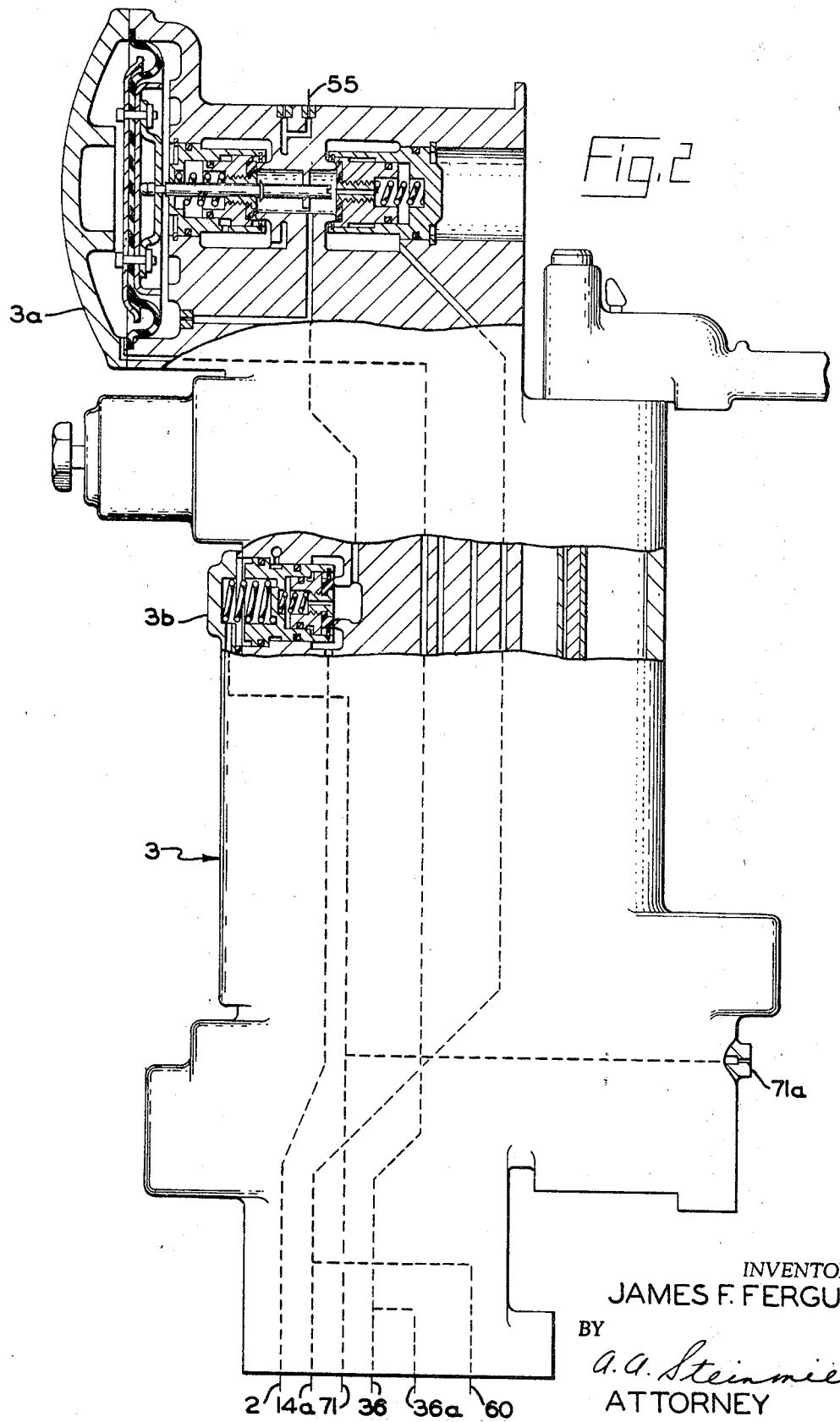

1

3,525,556
FLUID PRESSURE BRAKE APPARATUS FOR REMOTE MULTIPLE UNIT LOCOMOTIVE TRAINS
James F. Ferguson, Irwin, Pa., assignor to Westinghouse Air Brake Company, Wilmerding, Pa., a corporation of Pennsylvania
Filed Sept. 23, 1968, Ser. No. 761,707
Int. Cl. B60t *11/32*
U.S. Cl. 303—67                                   11 Claims

ABSTRACT OF THE DISCLOSURE

An apparatus utilized in multiple unit train brake controls for preventing an undesired recharging of the brake pipe by a brake valve on a railway locomotive at a location in the train remote from the lead locomotive which would otherwise result when a brake pipe reduction calling for a brake application is effected by the operation of the brake valve on the lead locomotive at a time when normal control communication from the lead locomotive to said remote locomotive is interrupted thereby preventing initiation of such application at said remote locomotive in normal manner.

BACKGROUND OF INVENTION

A remote multiple unit brake equipment for very long freight trains is presently being utilized wherein a brake control means on a master unit, usually on a locomotive at the head of the train, effects control over the brakes in various slave units interspersed throughout the train, via one or more train line wires connected between all units and radio control between the master unit and the rear slave unit. The brake valve handle on each of the remote units is locked in release position for maintaining the brake pipe charged. Brake control commands from the lead locomotive are received at the remote unit in the form of an electrical signal from the master unit. Receipt of the signal causes the brake control center and the brake valve to respond so as to duplicate the indicated brake control operation by regulation of the equalizing reservoir pressure. If a brake application signal is given and the normal electrical communication from the master unit is interrupted, the brake control center on the remote units will not operate to control the brake valve to initiate an intended application, and the brake valve will continue to operate to attempt to restore the brake pipe reduction at the remote unit resulting from operation of the brake valve on the lead locomotive, thereby providing the undesired situation wherein the master unit is attempting to apply the brakes by reduction of brake pipe pressure, while the remote units are attempting to recharge the brake pipe, thereby preventing the application of the brakes on the remote unit.

SUMMARY OF INVENTION

According to the present invention there is provided for a multiple unit train a pneumatic brake control apparatus located on a remote locomotive unit, said apparatus comprising a plurality of pneumatically controlled valves for sensing a brake pipe reduction at the remote locomotive unit when electrical communication from the master unit is interrupted. Upon sensing the brake pipe reduction, the aforesaid valves on the remote unit operate cooperatively to cause feed valve pressure thereon to operate an interlock valve which in turn effects operation of other pneumatic valves on the remote unit to vent the equalizing reservoir on the remote unit to atmosphere and supply main reservoir pressure on the remote unit to the usual brake pipe cut-off valve in the brake valve on the remote unit to prevent charging of the brake pipe at said remote unit during a brake application initiated from the lead locomotive and following such application until the present apparatus on the remote unit is manually restored to normal operation after the aforesaid interrupted communication thereto has been restored.

In the accompanying drawings, FIG. 1 shows apparatus embodying the invention and located on a remote locomotive in a train having multiple unit locomotives.

FIG. 2 shows partly in detail and partly in outline, the brake valve device utilized in the apparatus of FIG. 1.

DESCRIPTION

Referring to the drawings in FIG. 1, there is shown the apparatus on a locomotive unit located in a train remote from the lead or master locomotive unit. The apparatus is connected to the train brake pipe 1 by a pipe 2 and includes a conventional brake valve 3, having a relay valve 3a and brake pipe cut-off valve 3b (FIG. 2) such as the Westinghouse Air Brake Company 26–C brake valve, as disclosed in U.S. Pat. 2,958,561 and the brake control center 4 electrically controlled from the lead locomotive by the train wires 5, 6 and 7 to effect operation of the relay valve 3a of the brake valve 3 in a well-known manner. Upon loss of control via the train wires 5, 6 and 7 the operation of the brake valve 3 is controlled by the cooperative operation of a pilot valve 8, delay valve 9, interlock valve 10, cut-off valve 11, a double check valve 12 and a manually operated two-way valve 13 in a manner described herein with fluid under pressure supplied from a main reservoir 14 and main reservoir pipe 14a via a pressure regulating or feed valve 15.

The pilot valve 8 comprises a valve body 16, a piston valve 17 having a spring-loaded diaphragm piston 18 with a chamber 19 on one side connected to a volume 20, and a chamber 21 on the opposite side connected by way of branch pipe 22 having a venturi port 23 therein to cause a venturi action therein when venting chamber 21 to the brake pipe 1. A spool valve 24 operated by a piston stem 25 selectively connects a pipe 26 either to atmosphere or to the feed valve 15 by ports in the valve body 16 as explained hereinafter. The pipe 26 is also connected by way of the delay valve 9 to the spring-loaded double check valve 12 and thence via a pipe 27 to a piston chamber 28 in the interlock valve 10.

The delay valve 9 comprises a valve body 29 housing a spring-loaded diaphragm piston valve 30 having a diaphragm piston 31 with a chamber 32 on one side thereof connected to a volume reservoir 33 and also connected via a pipe 34, a choke 35, and a pipe 39 to an equalizing reservoir pipe 36 which is connected to an equalizing reservoir (not shown) and is charged via the brake control center 4 from a charging pipe described hereinafter. At the opposite side of said piston 31 is a chamber 37 containing a spring 38 and connected directly to the aforesaid equalizing reservoir pipe 36 via pipe 39. A valve 40 operated by a piston stem 41 of the piston valve 30 selectively controls a connection of the pipe 26 via a chamber 42 through a passage in a valve 43, past a valve seat 43a on the valve 43 to a chamber 44 and a pipe 45 to the spring-loaded double check valve 12. Downward movement of the piston stem 41 in accordance with the relative pressures in the chambers 32 and 37 acting on the piston 31 causes the valve 40 to seat on valve seat 43a and cut-off communication between chambers 42 and 44, while further downward movement of the valve 40, moves the valve 43 downward to establish communication between chamber 42 and an atmospheric port 46.

The spring-loaded double check valve 12 comprises a spring 47 in a chamber 48, and a valve member 49 which is biased to one position as shown by the spring, in which communication between pipes 45 and 27 is effected. When the relative pressures acting on opposite sides of valve member 49 is such as to overcome the force of spring 47, the valve member is shifted to cut off communication between pipes 45 and 27 and establish connection between pipe 27 and another pipe hereinafter described.

The interlock valve 10 comprises a spring-loaded diaphragm piston valve 50 having a piston 51 with the chamber 28 on one side thereof connected to pipe 27 and a chamber 52 on the opposite side thereof. The chamber 52, housing a spring 53, is connected to a conventional choked brake pipe exhaust port 54 on the brake valve 3 by a brake pipe exhaust pipe 55, and also via a choked port 56 to atmosphere. A piston stem 57 in the form of a spool type valve having an annular groove 58 selectively controls connection of ports in a valve body 59 of said interlock valve 10 to connect an equalizing reservoir charging pipe 60 and branch pipe 60a to atmosphere at a choked exhaust port 61 to vent said pipes at a reduced rate when desired as explained hereinafter.

The equalizing reservoir charging pipe 60 being supplied by the main reservoir pipe 14a through the brake valve in a well-known manner is also connected to a chamber 62 in the cut-off valve 11. The cut-off valve 11 comprises a valve body 63 housing a spring-loaded diaphragm piston valve 64 having a diaphragm piston 65 with a spring 66 in chamber 62 on one side thereof and a chamber 67 on the opposite side thereof. A piston stem 68 therein in the form of a spool type valve having an annular groove 69 selectively controls communication between a main reservoir branch pipe 70 from the main reservoir 14 to a high pressure pipe 71 which in turn is connected to one end of the double check valve 12 in opposition to the spring 47 and also to the usual brake pipe cut-off valve 3b (FIG. 2) in the brake valve 3. A manually operated two-way valve 13 is in the pipe 70 to selectively control delivery of main reservoir pressure from the main reservoir.

A one-way check valve 72 is connected to the usual electrically controlled brake control center 4 between the equalizing reservoir pipe 36 and the equalizing reservoir charging pipe 60 to prevent back flow of fluid under pressure from the equalizing reservoir (E.R.) and pipe 36 through the brake control center 4 to pipe 60 for reasons described hereinafter.

OPERATION

Under normal operating conditions, brake valve 3 on the remote unit shown in the drawing, is in release position to maintain the brake pipe 1 charged from the main reservoir 14 via main reservoir pipe 14a and pipe 2. When a brake application is called for on the master unit (not shown), electrical signals are transmitted via train wires 5, 6 and 7 throughout the train to operate the brake control center 4 on the remote units in a well-known manner to reduce the fluid pressure in the equalizing reservoir pipe 36 and the equalizing reservoir (E.R.) connected to the brake valve by pipe 36a to cause the relay valve 3a (FIG. 2) of the brake valve 3 to effect corresponding reduction in brake pipe pressure to thereby effect initiation of the brake application. Suitable brake control apparatus (not shown) is provided in conventional manner to effect supply of fluid under pressure to the brake cylinders (not shown) to effect brake application responsively to reduction in brake pipe pressure. If electrical communication from the master unit is interrupted by a possible break in any of wires 5, 6 and 7, the brake control center 4 on the remote unit will not function, and the brake valve 3 thereon will be unable to recognize a brake pipe reduction from the master unit as an intended brake application, but will attempt to restore the brake pipe reduction by recharging the brake pipe locally. This unintended recharging is prevented by the present apparatus in the manner now to be described.

With loss of electrical communication from the master unit to the remote brake control center 4, upon initiation of brake pipe reduction by operation of the brake valve on the lead locomotive to effect a brake application, the initial reduction of the brake pipe will cause the pilot valve 8 to respond before the recharging operation of the brake valve 3 can occur in a manner described herein. Reduction of the brake pipe pressure and consequent reduction in branch pipe 22 causes a reduction of pressure in the chamber 19 and the chamber 21 of the pilot valve 8. Due to the venturi action effected by the venturi port 23, a partial vacuum is created at the venturi port 23 to create a drop in the pressure in chamber 21 of the pilot valve at a rate faster than the drop in pressure in the combined chamber 19 and volume 20 of the pilot valve 8. This unbalance of fluid pressure on piston 18 causes the piston 18 to move upward from the position shown in the drawing in a manner to cut-off normal communication from pipe 26 around and through the spool valve 24 to an exhaust port 73 by engagement of the outer extremity of the piston stem 25 with a valve 74 and to effect unseating of valve 74 to permit the feed valve pressure from the feed valve 15 to flow via a passage around the spool valve 24 between the piston stem 25 and the pilot valve body 16 to the pipe 26.

The feed valve pressure thus connected to pipe 26 is supplied to the chamber 42 in the delay valve 9. Under the conditions just described, with electrical communication from the master unit interrupted, the delay valve 9 will be in the position shown on the drawing with the valve 40 unseated such that the fluid under pressure in chamber 42 may flow through the passage in valve 43 past valve seat 43a to chamber 44 and thence to pipe 45 leading to the double check valve 12. The fluid under pressure supplied to said double check valve 12 flows through spring chamber 48 on one side (the lower) of the valve member 49 to the pipe 27 leading to a chamber 28 at the underside of piston 51 in the interlock valve 10. Supply of fluid to the chamber 28 in said interlock valve 10 causes the piston 51 and piston stem 57 thereof to move upward from the position in which they are shown to connect the equalizing reservoir charging pipe 60 and branch 60a through the groove 58 in the piston stem 57 of the interlock valve 10 to atmosphere at the choked exhaust port 61. With the equalizing reservoir charging pipe 60 vented to atmosphere through the choked exhaust port 61, as just described, the chamber 62 of the cut-off valve 11 is likewise vented to atmosphere at a slow rate, thereby permitting the pressure in the equalizing reservoir (E.R.) from the pipe 36a and equalizing reservoir pipe 36 connected to chamber 67 below the piston 65 thereof, to move said piston and piston stem 68 upward from the position in which it is shown. Upward movement of the piston stem 68 permits main reservoir pressure to flow via the two-way valve 13 and pipe 70 and the groove 69 in the piston stem 68 of the cut-off valve 11 to pipe 71 leading to the brake valve 3 to operate the brake pipe cut-off valve 3b (FIG. 2) in the brake valve 3 for preventing the normal charging of the brake pipe at the remote unit.

Main reservoir pressure in pipe 71 is supplied to the upper side of the double check valve 12 to move the valve member 49 downward against the combined force of spring 47 and the lower feed valve pressure in chamber 48 and thus causing fluid at main reservoir pressure to flow to the pipe 27 and the chamber 28 of the interlock valve 10 such that the interlock valve is "locked up" notwithstanding subsequent repositioning operation of the pilot valve 8 such as would occur after a short time interval by reason of equalization of the pressures acting on opposite sides of the piston 18. It will be understood that the piston 18 will be moved to its normal position, in which it is shown, by the force of a spring 75 to seat valve 74 and thereby cut-off supply of feed valve pressure to pipe 26 and connect said pipe to atmosphere at port 73. Since chamber 48 of double check valve 12 remains connected to pipe 26 via the delay valve 9, the pressure in chamber 48 is thus reduced to atmosphere to insure the double check valve 12 remaining in the position to supply main reservoir pressure to pipe 27 to cause lock-up of interlock valve 10.

The brake valve 3 will remain in this just-described condition, a so-called "cut-out" condition, indefinitely until the malfunction causing the interruption in the communication system via wires 5, 6 and 7 is corrected and the brake control center 4 can be again electrically operated to condition the brake system and the brake pipe cut-off valve 36 of the brake valve 3 on the remote unit for normal operation in a manner described hereinafter.

The two-way valve 13 is manually operated by depressing the lever or button thereon which permits internal passages (not shown) to cut-off supply of main reservoir pressure from the main reservoir 14 through to the pipe 70, groove 69 in the piston stem 68 of the cut-off valve 11 and pipe 71 leading to the brake pipe charging cut-off valve 3b (FIG. 2) in the brake valve 3. As is well known, the brake pipe cut-off valve chamber in the brake valve 3 is constantly connected to a well-known choked exhaust port 71a on the brake valve. Therefore, with the cut-off of the supply of main reservoir pressure to pipe 71 and the brake pipe cut-off valve chamber, the pressure therein will slowly bleed down via the well-known choked exhaust port represented by the choked exhaust port 71a. With the bleeding down of the fluid under pressure in pipe 71, the spring 47 of the double check valve 12 will move the valve member 49 upward to the position in which it is shown to cut-off communication between pipe 71 and pipe 27 and reestablish communication between pipe 27 and pipe 45 to chamber 44 of delay valve 9, past the valve seat 43a thereof to the chamber 42, and thence to pipe 26 leading to the pilot valve 8. The pilot valve, as previously mentioned, by this time, due to equalization of pressures acting on piston 18, has been restored to the position in which it is shown, with pipe 26 connected to the exhaust port 73 via the spool valve 24 of the pilot valve 3, thereby causing venting of the pipe 26, chambers 42 and 44 of the delay valve 9, pipe 45, pipe 27 and chamber 28 of the interlock valve 10. Venting of chamber 28 in turn causes the spring 53 to restore the piston 51 of the interlock valve 17 to its normal or "unlocked" position in which it is shown with the equalizing reservoir charging pipe 60 and branch pipe 60a, cut-off from exhaust via atmospheric choked exhaust port 61 at the piston stem 57 thereof. With the pipe 60a cut-off from its exhaust communication, the said pipe 60a and similarly the equalizing reservoir charging pipe 60 and the chamber 62 of the cut-off valve 11 are all recharged from the main reservoir 14, via main reservoir pipe 14a and the brake valve 3, to thereby permit the spring 66 to move the piston 65 of the cut-off valve 11 to the position shown in the drawing wherein the pipe 70 is blanked-off at the groove 69 of the piston stem 68 thereof. Thus, the manually operated valve 13 may be released and the apparatus has thereby been conditioned in normal running condition. The equalizing reservoir charging pipe 60 is constantly being charged by main reservoir pipe 14a, even while said pipe 60 and pipe 60a are connected to atmosphere. The choked exhaust port 61 is small enough to permit exhaust therethrough at a slow rate sufficient to effect the described operation of the cut-off valve 11. Venting through choked port 61 continues until the malfunction is corrected.

It should be noted that under conditions where communication continuity does exist between the master unit and the remote unit and a brake application signal from the master unit is received at the remote unit, it is necessary that the pilot valve of the present apparatus be rendered ineffective to cause the brake valve cut-off valve operation just previously described to nullify the operation of the brake valve 3. This is the function of the delay valve 9 and is accomplished in a manner now described. Upon the receipt of the electrical signal for a brake application via the wires 5, 6 and 7, the brake control center 4 operates the brake valve 3 immediately in a usual manner to vent the equalizing reservoir (E.R.), pipe 36a and consequently the equalizing reservoir pipe 36 and connected pipes 34 and 39 leading to the chambers 32 and 37 of the delay valve 9. In that chamber 32 is connected to a volume reservoir 33 and both said reservoir and chamber 32 must be vented via a choke 35, while the chamber 37 is vented directly, it can be seen that the resultant reduction in pressure is effective at a faster rate in chamber 37. Venting of chamber 37 faster than venting of chamber 32 results in a differential pressure force on piston 31 which effects movement of the piston downward, from the position shown in the drawing, to first seat the valve 40 on the valve seat 43a to close off communication between chambers 42 and 44 and thus between pipe 26 and pipe 45, and then move valves 40 and 43 downward to unseat valve 43 and establish communication from pipe 26 and chamber 42 to atmosphere at pipe 46. This operation causes venting of pipe 26 to atmosphere to thereby prevent any operation of the interlock valve 10 due to the fact that no fluid under pressure is supplied to pipes 45 and 27 and chamber 28 of the said valve. This condition is maintained until the pressures in chambers 32 and 37 of the delay valve 9 are equalized, an operation that requires a period of time sufficient to have brake application operation effectively in process before any operation of pilot valve 8 is effective.

After initiation of the brake application while the communication is intact, the brake pipe is vented at the brake valve in response to the reducing equalizing reservoir in a normal well-known manner. The brake pipe pressure is vented at port 54 on the brake valve, through a pipe 55, thence to chamber 52 of the interlock valve 10 and from there is exhausted to atmosphere by a choked port 56 in the interlock valve 10. Due to the choked port 56, the pressure in chamber 52 is permitted to build up sufficiently to prevent any upward movement of the piston 51 and any inadvertent operation of the interlock valve by a fluid pressure in pipe 27 which might be supplied from the pilot valve in the event that any undesired pressure differential occurs across the piston 18 of the pilot valve 8 after the function of the delay valve 9 has been served. Thus, when a brake application is called for and communication continuity is intact, the delay valve initially prevents the interlock valve from operating for a first time interval until the brake application operation is sufficiently initiated at which time the reduction in brake pipe pressure via pipe 55 maintains the interlock valve 10 in a condition such that the pilot valve 8 will have no effect if inadvertently operated.

Having now described the invention, what I claim as new and desire to secure by Letters Patent is:

1. Fluid pressure brake control apparatus for use on a locomotive unit intermediately located in a train of cars having a lead locomotive from which the intermediate locomotive unit is remotely controlled, said apparatus comprising the combination of a train brake pipe normally charged to a chosen pressure, reduction from which initiates a brake application on the intermediate locomotive unit and connected cars, an equalizing reservoir normally charged to the pressure in the brake pipe, a brake valve having a relay valve means controlled according to the differential of opposing pressures in the equalizing reservoir and in the brake pipe and responsive to a reduction from the normal pressure in the equalizing reservoir to effect a corresponding reduction in brake pipe pressure, said relay valve means being operative in the event of reduction of brake pipe pressure below that of equalizing reservoir pressure to effect charging of the brake pipe, said brake valve having a brake pipe cut-off valve normally operable to enable charging of the brake pipe by fluid under pressure supplied by operation of the relay valve means and effective when closed to prevent charging of the brake pipe, and electrically controlled valve means remotely controlled from the lead locomotive and operative, upon initiation of a brake application, to normally effect reduction of the pressure in the equalizing reservoir whereby to cause operation of said relay valve means to effect a brake pipe reduction resulting in a brake application, wherein the improvement comprises fluid pressure operated valve means, operation of which is initiated by the reduction of pressure in the brake pipe at the intermediate locomotive unit, simultaneously with failure of the electrically controlled valve means to effect a reduction in equalizing reservoir pressure in a normal manner, for causing a supply of fluid under pressure to a chamber in said brake pipe cut-off valve to hold it in its closed position to thereby prevent operation of said relay valve means to charge the brake pipe.

2. Fluid pressure brake control apparatus as claimed in claim 1, further characterized in that said fluid pressure operated valve means comprises:
 (a) valve means operative from a normal cut-off position to a supply position in which fluid under pressure is supplied to the chamber of said brake pipe cut-off valve means to cause it to be held in its closed position, and
 (b) pilot valve means operatively responsive to a reduction of brake pipe pressure at the intermediate locomotive unit while a failure of said electrically controlled valve means exists for effecting operation of said valve means.

3. Fluid pressure brake control apparatus as claimed in claim 1, further characterized in that the said fluid pressure operated valve means comprises:
 (a) valve means operative from a normal cut-off position to a supply position in which fluid under pressure is supplied to the chamber of said brake pipe cut-off valve means to cause it to be held in its closed position,
 (b) interlock valve means operatively responsive to supply of fluid under pressure thereto from a normal position to an operative position to effect operation of said valve means to its supply position,
 (c) pilot valve means operatively responsive to reduction of brake pipe pressure at the intermediate unit while a failure of said electrically controlled valve means exists, for effecting an initial supply of fluid under pressure to effect an initial operation of said interlock valve means to an operative position, and
 (d) pressure-responsive valve means operative responsively to supply of fluid under pressure to the chamber of said brake pipe cut-off valve means by the said valve means for effecting a secondary supply of fluid under pressure to said interlock valve means to maintain it in its operative position.

4. Fluid pressure brake control apparatus as claimed in claim 3, further including a manually operated valve means for cutting off the supply of the pressure supplied to the chamber of said brake pipe cut-off valve by the said valve means, and choke means effective to vent fluid pressure from said chamber whereby to effect restoration of said brake pipe cut-off valve means to its normal condition after a failure condition of said electrically controlled valve means has been corrected.

5. Fluid pressure brake control apparatus as claimed in claim 4, wherein the operation of said manually operated valve means to cut off supply of pressure to the chamber of said brake pipe cut-off valve means by the said valve means and permit venting of said chamber by said choke means, also causes said pressure-responsive valve means to be operated to cut off the said secondary supply of fluid under pressure to said interlock valve means and permit venting of fluid pressure supplied thereto whereby effecting restoration of the interlock valve means to its normal position and the consequent restoration of the said valve means to its normal cut-off position.

6. Fluid pressure brake control apparatus as claimed in claim 1 further including an inhibiting valve means operatively responsive to reduction of equalizing reservoir pressure under normal control by the electrically controlled valve means for rendering the operation of the fluid pressure operated valve means noneffective to cause supply of fluid under pressure to the chamber of the brake pipe cut-off valve means.

7. Fluid pressure brake control apparatus as claimed in claim 2 further including an inhibiting valve means operative to a control position responsively to a reduction of equalizing reservoir pressure under normal control by the electrical valve means to vent supply of fluid under pressure from said pilot valve and to render said pilot valve noneffective to cause operation of said valve means and operative to a normal position responsively to cessation of reduction of equalizing reservoir pressure to render said pilot valve effective to operate said valve means.

8. Fluid pressure brake control apparatus as claimed in claim 2, further including a fluid pressure controlled valve means responsive to pressure of fluid vented from the brake pipe by the operation of the relay valve means under normal control of the electrically controlled valve means, for rendering operation of said pilot valve means noneffective to cause operation of said valve means to its supply position.

9. Fluid pressure brake control apparatus as claimed in claim 3, further including fluid pressure means operatively responsive to the pressure of fluid vented from the brake pipe by operation of the relay valve means under normal control of the electrical controlled means for preventing movement of said interlock valve means to its operative position to cause operation of said valve means notwithstanding operation of the pilot valve means responsively to reduction of brake pipe pressure.

10. Fluid pressure brake control apparatus as claimed in claim 3, further including a delay valve operatively responsive to initial reduction of equalizing reservoir pressure under normal control by the electrically controlled valve means from a normal position, in which it establishes a fluid pressure control communication between said pilot valve means and said interlock valve means, to an operative position in which it interrupts said control communication and renders the operation of the pilot valve means noneffective to cause operation of the said interlock valve means to its operative position for causing operation of said valve means, and fluid pressure means operatively responsive to the pressure of fluid vented from the brake pipe by operation of the relay valve means responsively to initial reduction of equalizing reservoir pressure under normal control of the electrically controlled means for preventing movement of said interlock valve means to its operative position for causing operation of said valve means notwithstanding prior restoration of the said delay valve means to its normal position.

11. Fluid pressure brake control apparatus as claimed in claim 2, wherein said pilot valve means comprises:
 (a) a pilot valve having a normal venting position and a fluid pressure supply position,
 (b) movable abutment means subject in opposing relation to the fluid pressure in two chambers on opposite sides thereof and operative upon the occurrence of a pressure differential therebetween to effect operation of said pilot valve to its supply position, and
 (c) venturi port means via which fluid under pressure is supplied to and released from said chambers, one of said chambers being connected to the throat of the venturi port and having a correspondingly lower pressure than the other chamber upon reduction of pressure in the said other chamber by flow through said venturi port upon reduction of brake pipe pressure, to thereby effect a pressure differential on said movable abutment means.

References Cited
UNITED STATES PATENTS 2,367,575 1/1945 Good _____ 303—67 X
3,374,035 3/1968 Howard _____ 303—20

DUANE A. REGER, Primary Examiner

U.S. Cl. X.R.

303—20